US008509738B2

(12) United States Patent
Cutts et al.

(10) Patent No.: US 8,509,738 B2
(45) Date of Patent: Aug. 13, 2013

(54) SECURE DEVICE IDENTIFICATION PROTOCOL WITH AUTONOMOUS DETERMINATION OF SPECIFIC CLASS AND CAPABILITIES OF AN ELECTRONIC DEVICE CRADLE CONNECTED TO AN ELECTRONIC DEVICE

(75) Inventors: Kevin M. Cutts, Lake Zurich, IL (US); David M. Hess, McHenry, IL (US)

(73) Assignee: Motorola Mobility LLC, Libertyville, IL (US)

( * ) Notice: Subject to any disclaimer, the term of this patent is extended or adjusted under 35 U.S.C. 154(b) by 114 days.

(21) Appl. No.: 13/276,339

(22) Filed: Oct. 19, 2011

(65) Prior Publication Data

US 2013/0102282 A1   Apr. 25, 2013

(51) Int. Cl.
*H04M 1/68* (2006.01)
(52) U.S. Cl.
USPC ............ 455/411; 455/414.1; 455/414.3; 455/419; 455/41.1; 455/41.2
(58) Field of Classification Search
USPC .......... 455/411, 414.1–414.3, 419, 41.1–41.2
See application file for complete search history.

(56) References Cited

U.S. PATENT DOCUMENTS

| 5,463,742 A | 10/1995 | Kobayashi |
| 6,938,104 B2 * | 8/2005 | Levy ............................ 710/8 |
| 2009/0132076 A1 | 5/2009 | Holden et al. |
| 2011/0125601 A1 | 5/2011 | Carpenter et al. |
| 2012/0054399 A1 | 3/2012 | Lemarchand |

FOREIGN PATENT DOCUMENTS

WO   2010107580 A1   9/2010

* cited by examiner

*Primary Examiner* — Kiet Doan
*Assistant Examiner* — Michael T Vu (57) ABSTRACT

An electronic device comprises: a memory having one or more class capabilities look-up tables; a communication port that enables connection of the electronic device to a device interface mechanism of a cradle accessory; an accessory authentication mechanism including configuration logic that, responsive to detection of an electrical coupling of the electronic device to the cradle accessory: initiates an authentication protocol that authenticates the cradle as an approved device for communicatively connecting with the electronic device; receives, from the cradle, N device status bits having a first set of M class bits that identify a class type of the cradle and a second set of P capabilities bits that identify which capabilities available to devices in that class type are supported by the cradle; and activates, on the electronic device and cradle, the one or more specific capabilities supported by the cradle, based on the class type and associated capabilities.

20 Claims, 7 Drawing Sheets

Capabilities Mapping/Lookup Table 600

| Capability Bit | Supported/Corresponding Capability |
|---|---|
| 0 | — |
| 1 | In-vehicle mode 1 |
| 2 | In-vehicle mode 2 : GPS mapper |
| 3 | I/O capability – hands free |
| 4 | Display capability 1 – clock |
| 5 | Display capability 2 – large |
| 6 | |
| 7 | audio mode 2 : local speakers |
| 8 | audio mode 2 : in vehicle audio |
| 9 | audio mode 3 : ............... |
| 10 | |
| 11 | |
| 12 | |
| 13 | |
| 14 | |
| 15 | |
| 16 | Next Generation device capability |
| 17 | Reserved – future capability |
| 18 | Reserved – future capability |

FIG. 6

SECURE DEVICE IDENTIFICATION PROTOCOL WITH AUTONOMOUS DETERMINATION OF SPECIFIC CLASS AND CAPABILITIES OF AN ELECTRONIC DEVICE CRADLE CONNECTED TO AN ELECTRONIC DEVICE

BACKGROUND

1. Technical Field

The present disclosure relates in general to electronic device functionality and in particular to configuration of an accessory to which the electronic device can connect. More specifically, embodiments of the present disclosure relate to a mechanism and/or methodology for autonomously determining a class of and capabilities associated with an electronic device cradle.

2. Description of the Related Art

Cradles for docking of smart phones are generally known. There are a variety of different types of cradles, and each cradle can provide and/or support a different set of functions, which may not be discoverable by and/or available to the particular phone that is connected to the cradle. One aspect of the evolution and/or development of these cradles and phones is the utilization within most of these devices of a standard connection mechanism that is supported by the various different vendors of these devices. Specifically, conventional implementations of these smart phones and the cradles provide for connecting these cradles to the smart phones utilizing some form of a mini/micro universal serial bus (USB) connector. With the phones and devices across vendors having similar connection mechanisms, vendors occasionally also implement security mechanisms to prevent their phones from being utilized with an incorrect and/or unlicensed and/or unapproved accessory.

BRIEF DESCRIPTION OF THE DRAWINGS

The described embodiments are to be read in conjunction with the accompanying drawings, wherein.

DETAILED DESCRIPTION

The illustrative embodiments provide an electronic device which comprises: a memory having one or more class capabilities look-up tables; a communication port that enables connection of the electronic device to a device interface mechanism of a cradle accessory; an accessory authentication mechanism including configuration logic that, responsive to detection of an electrical coupling of the electronic device to the cradle accessory: initiates an authentication protocol that authenticates the cradle as an approved device for communicatively connecting with the electronic device; receives, from the cradle, N device status bits having a first set of M class bits that identify a class type of the cradle and a second set of P capabilities bits that identify which capabilities available to devices in that class type are supported by the cradle; and activates, on the electronic device and cradle, the one or more specific capabilities supported by the cradle, based on the class type and associated capabilities.

The illustrative embodiments further provide a cradle for receiving an electronic device. The cradle comprises: an external casing having a device interfacing mechanism; an integrated circuit (IC) disposed within the casing and electrically coupled to the device interfacing mechanism. The IC comprises authentication information of the cradle and N device status bits having: (a) a first set of M class bits that define to the electronic device a particular class type of the cradle among a plurality of different classes of cradles; and (b) a second set of P capabilities bits that identify to the electronic device which functionality of a plurality of possible functionalities are supported by the cradle for the identified class type of the cradle. The cradle further comprises logic associated with the IC that, responsive to detection of an electrical coupling of a communication port of an electronic device to the device interfacing mechanism of the cradle, automatically transmits the N device status bits to the electronic device. Transmission of the N device status bits causes the connected electronic device to activate specific operating functions based on receipt and identification of the M class bits and P capabilities bits transmitted from the cradle.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example mobile device architecture having a specific processing unit and functional logic. The illustrative and described embodiments assume that both the components within the architecture as well as the location of specific logic within one or more of the components can be different from that illustrated.

Figure 1:
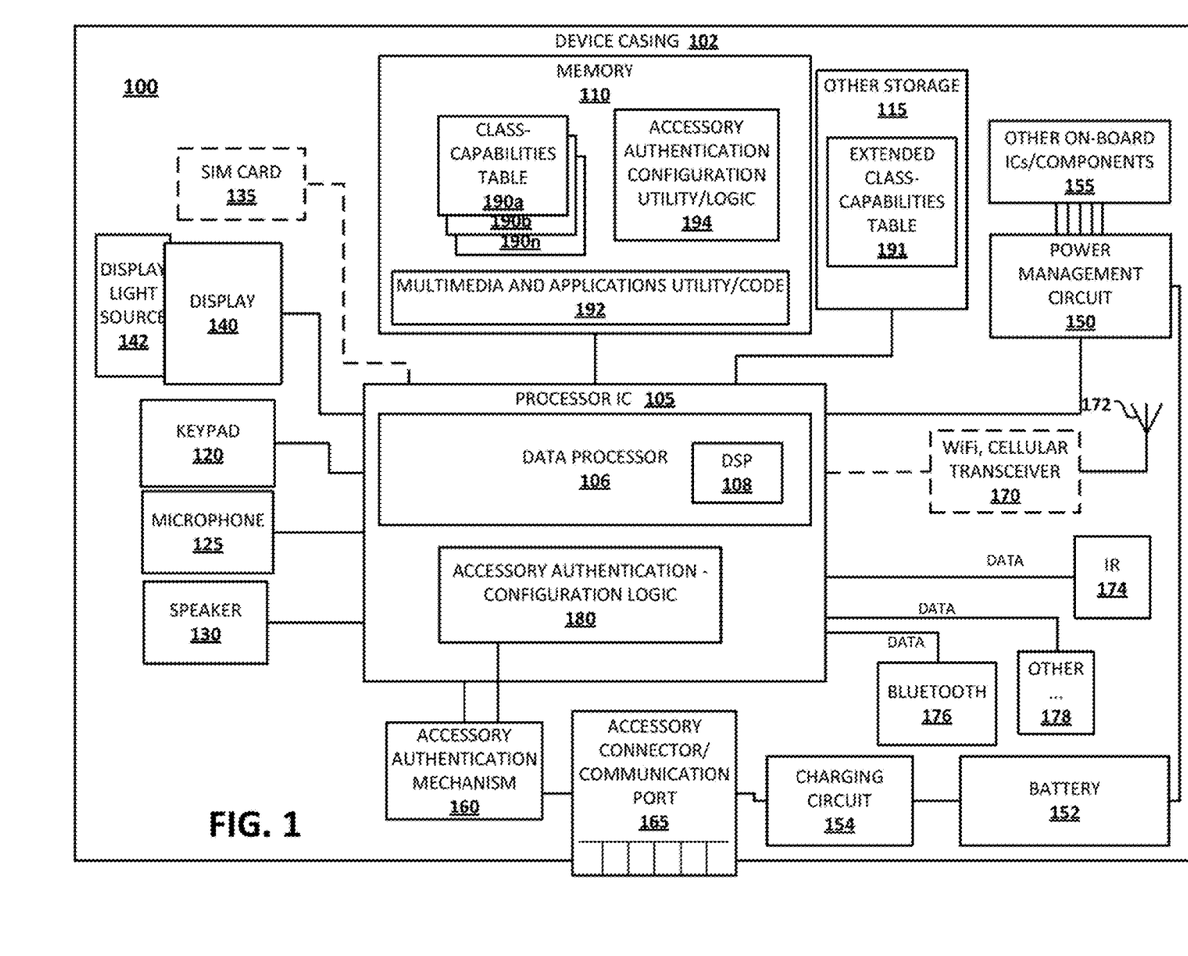
FIG. 1 is a block diagram representation of an example electronic device within which various features of the described embodiments are implemented.

With specific reference now to FIG. 1, there is provided a block diagram depicting the component-level architecture of an example electronic device 100, within which functional aspects of the described embodiments can advantageously be implemented. For simplicity in describing the embodiments herein, example electronic device 100 is assumed to be mobile phone and will hereinafter be referred to as mobile phone 100. While the embodiments presented herein are specifically described with reference to an example mobile phone, it is appreciated that the functionality and/or features of the described embodiments are fully applicable to different types of electronic devices that are capable of being electrically and/or communicatively coupled to a cradle or other device accessory via a physical connector, such as a mini/micro universal serial bus (USB). Mobile phone 100 comprises a device casing 102 which houses/encases a plurality of functional components of mobile phone 100, including processor integrated circuit (IC) 105 comprising data processor 106 and integrated digital signal processor 108. Processor IC 105 can be generally and interchangeably referred to as "processor" to represent all of the processing components and functional logic provided on the processor IC 105. Coupled to processor IC 105 are memory 110, other persistent storage 115, and one or more input/output (I/O) components, of which keypad 120, microphone 125, and audio speaker 130 are illustrated. The I/O components coupled to processor IC 105 further comprise display device 140, which has a display light source 142 associated therewith. In one embodiment, display 140 can be a touch screen display, and depending on the level of user interface functionality supported by the touch screen display, mobile phone 100 can optionally not be provided a keypad 120.

Processor IC 105 and the other components of mobile phone 100 that require electrical power can be coupled to and receive power from power management circuit 150. Power management circuit controls the distribution of electrical power to the various components of mobile phone 100 via a power distribution mechanism on the phone's motherboard (not specifically shown), on which the components are built/embedded. Power management circuit 150 couples to a power source, such as a battery 152 and/or a charging circuit 154. Power management circuit 150 also provides electrical power to the various other on-board ICs and/or components, generally represented by block 155.

The various I/O components allow for user interfacing with mobile phone 100. In addition to these above components, mobile phone 100 can also include other components utilized to enable standard voice, data, and/or multimedia communication from/to mobile phone 100. Among these components are wireless transceivers 170, which are connected to antenna 172 to enable communication of radio frequency (RF)/wireless signals from and to mobile phone 100. Certain forms of the received RF/wireless signals can be converted into audio, which can be outputted via speaker 130 during a voice communication being facilitated and/or performed via mobile phone 100. Also illustrated as example communication components for communicating data and/or other content to and from mobile phone 100 are infrared (IR) transceiver 174, Bluetooth transceiver 176, and a general other communication module(s) 178, representing other types of transceivers and/or communication portals.

Depending on the type of network for which the mobile phone 102 is designed, mobile phone 100 can comprise a Subscriber Identity Module (SIM) card 135 that stores unique features corresponding to the particular subscriber in possession of the SIM card 135. For example, mobile phone 100 can be a global system for mobile communication (GSM) phone and thus includes SIM card 135, which connects to processor IC 105 via a SIM card adapter/port (not shown). SIM card 135 may be utilized as a storage device for storing data or general content, similar to other storage 115 and/or memory 110.

To enable mobile phone 100 to connect to and interface with one or more accessories, mobile phone 100 comprises accessory connector, which can also be referred to as accessory communication port 165. Accessory communication port 165 is coupled to an accessory authentication mechanism 160, which can be located on processor IC 105, in one or more embodiments. In an alternate embodiment, accessory authentication mechanism can be integrated within or be provided by programmable logic on processor IC 105, such as Accessory Authentication and Configuration (AAC) logic 180. In this embodiment, accessory communication port 165 is coupled to the processor 105 and enables connection of the mobile phone 100 to a device interface mechanism of an accessory.

As illustrated, processor IC 105 can include a programmable microprocessor (of which data processor 106 is provided as an example), as well as a digital signal processor (DSP) 108 that controls the communication and other signal processing functions/operations of mobile phone 100. These functions/operations can include, but are not limited to, data processing and signal processing, respectively. Additionally, the functions/operations of the programmable microprocessor (data processor 106) can include AAC logic 180, which supports the authentication and configuration processes for authenticating and configuring a connected accessory, such as a cradle. These authentication and configuration features are described in greater detail below. In one embodiment, AAC logic 180 comprises programmable code that automatically executes on data processor 106 when connection to the accessory via accessory communication port 165 is detected.

In addition to the above hardware components, several functions of mobile phone 100 and specific features of the invention may be provided as functional code and/or data that is stored within memory 110 and/or other storage 115 and executed on or utilized by data processor 106. Thus, data processor 106 executes the various functional code/firmware (e.g., accessory authentication and configuration utility (AACU) 194) to provide processor-level control for the authentication and configuration of a cradle accessory to which mobile phone 100 is physically coupled.

In addition to AACU 194, also stored within memory are one or more class capabilities look-up tables 190a-n. Also stored within memory are and one or more multimedia and applications utilities 192, which when executed by processor 106 enables various functional features and generates the user interface mechanisms of mobile phone 100. According to one implementation, AACU 194 is executed by processor 106, and AACU 194 generates AAC logic 180, which performs/provides the following functions, among others: (1) initiates an authentication protocol to authenticate the cradle as being an approved device for communicatively connecting with the mobile phone; receives, from the cradle, N device status bits having a first set of M class bits that identify a class type of the cradle and a second set of P capabilities bits that identify one or more capabilities of that class type that are supported by the cradle; and activates, on the mobile phone and cradle, the one or more specific capabilities supported by the cradle, based on the class type and associated one or more capabilities of that class type identified by the N device status bits. These functions represent a subset of the functional processes of the described embodiments, which processes are expanded upon below and illustrated in part by the flow chart of FIG. 9, as well as the other figures. In one alternate embodiment, the functions are performed in part by the accessory authentication mechanism 160 and specifically configuration logic that, initiates the authentication and configuration processes responsive to detection of an electrical coupling of the accessory communication port 165 with a device interface mechanism of the connected cradle.

Figure 2:
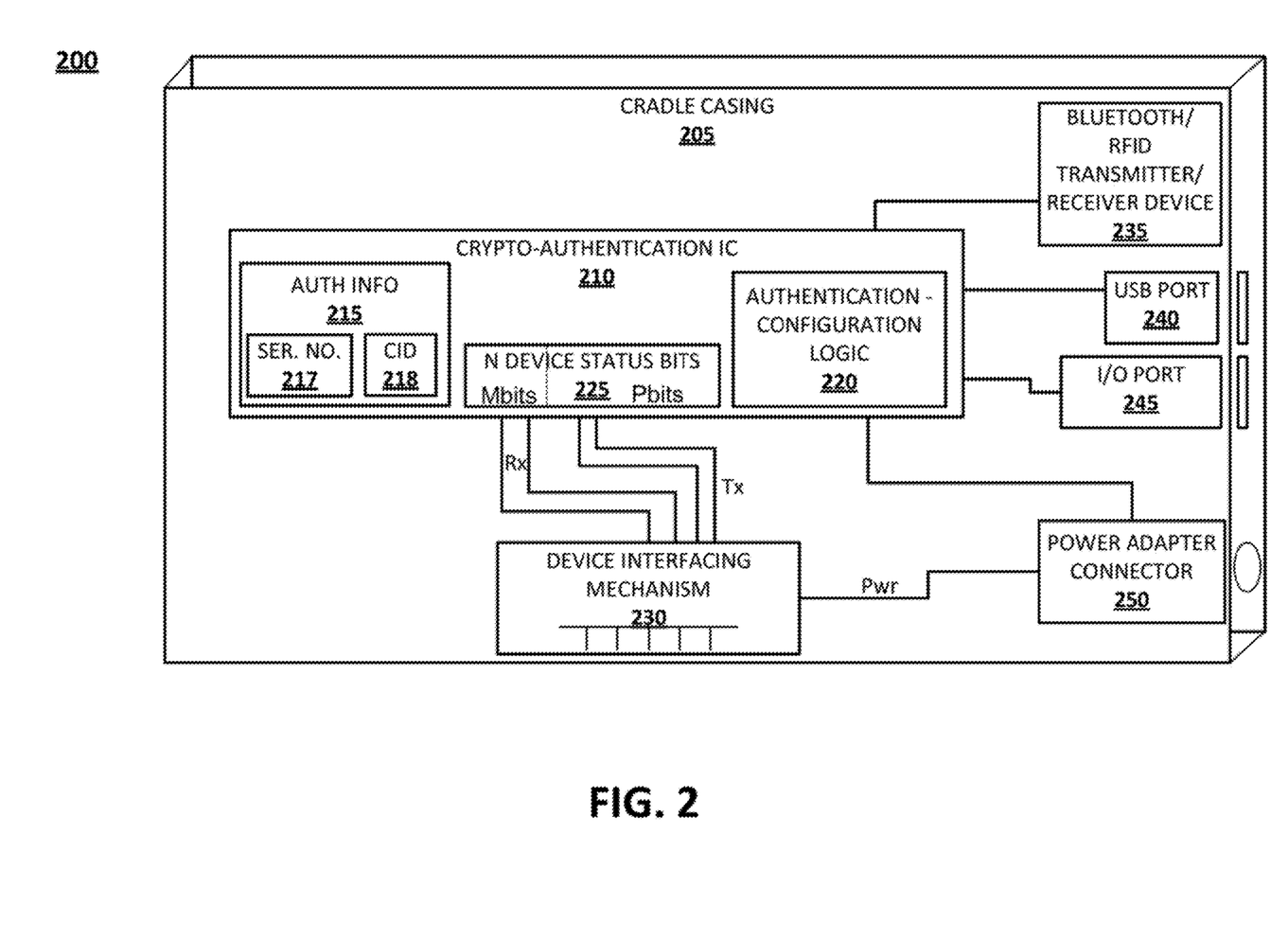
FIG. 2 is a block diagram representation of an example cradle having an integrated circuit for authenticating and configuring the device and N device status bits, according to one embodiment.

Referring now to FIG. 2, there is illustrated a block diagram representation of an example cradle 200, which is designed and manufactured as an accessory to example mobile phone 100. The cradle 200 is generally configured for receiving an electronic device, particularly a mobile phone, such as mobile phone 100. The cradle 200 comprises an external cradle casing 205, with a device interfacing mechanism 230 extending from a surface of the casing 205. It is to be understood that, in other examples, the device interfacing mechanism may be configured on the cradle such that it does not extend from a surface of the casing 205. Cradle casing 205 has specific dimension and shape to enable the mobile phone 100 to be docked on and/or inserted into the cradle 100 and to electrically and communicatively connect with device interfacing mechanism 230. Cradle 200 comprises integrated circuit (IC) 210 disposed within the cradle casing 205 and electrically and communicatively coupled to the device interfacing mechanism 230. IC 210 comprises authentication information 215 of the cradle 200, such as, but not limited to serial number 217 and unique cradle identifier (ID) 218. Also provided within IC 210 is a register comprising N device status bits 225. The N device status bits 225 comprises a first set of M class bits that define to the electronic device a particular class type of the cradle 200 among a plurality of different classes of cradles that can be available. The N device status bits 225 also comprise a second set of P capabilities bits that identify to the connected electronic device (e.g., mobile phone 100), which specific functionality/s of a plurality of possible functionalities are supported by the cradle 100 for the particular class type (identified by the M bits) of the cradle. IC 220 further comprises, or has associated therewith, authentication and configuration (AC) logic 220. Responsive to detection of an electrical coupling of a communication port (165) of an electronic device (e.g., mobile phone 100) to device interfacing mechanism 230 of the cradle 200, the cradle automatically transmits the N device status bits to the electronic device. In one embodiment, and as described in detail below, transmission of the N device status bits causes the electronic device connected to the cradle to activate specific operating functions based on receipt and identification of the M class bits and P capabilities bits transmitted from the cradle.

Cradle 200 can also comprise one or more I/O devices and one or more ports for coupling or wirelessly connecting the cradle to secondary devices. Of these possible other components, cradle 200 is illustrated having Bluetooth and/or RFID transceiver 235, one or more universal serial bus (USB) ports 240, and one or more I/O ports 245.

In one embodiment, device interfacing mechanism 230 can be a mini/micro USB receptor configured according to established mini/micro USB protocols. The mini/micro USB can also be a secure enhanced mini/micro USB (or SEMU). Device interface mechanism 230 is coupled via a plurality of receiving (Rx) buses and a plurality of transmission (Tx) buses to IC 210. As further illustrated, device interfacing mechanism 230 is coupled via a power (Pwr) bus to a power adapter connector 250 at which electrical power can be supplied to the cradle 100 from an external power source.

Figure 3:
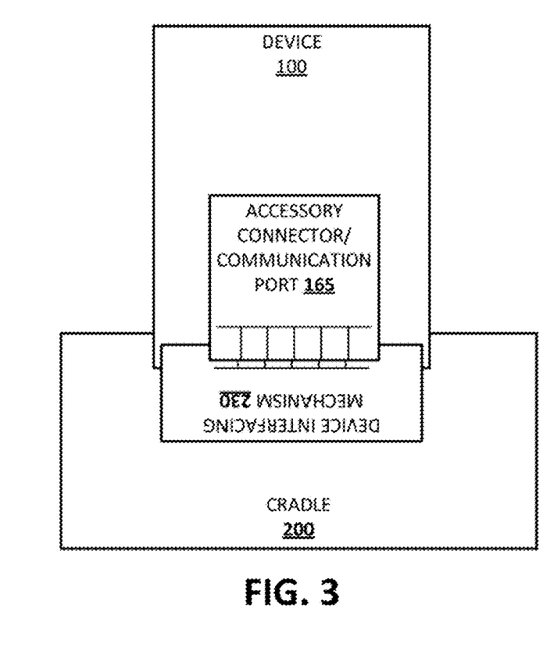
FIG. 3 illustrates a connection of an example electronic device to an example cradle via respective device interfacing mechanisms and/or ports, according to one embodiment.
Figure 4A:
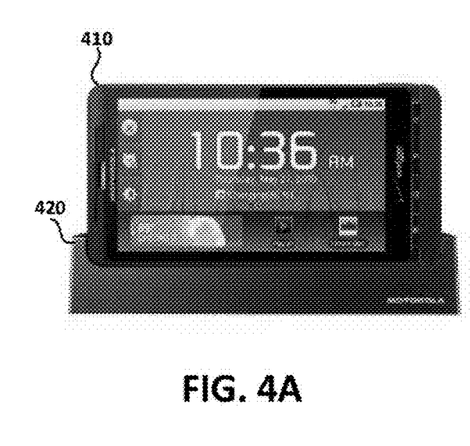
FIG. 4A illustrates an example desktop cradle with electronic device, according to one embodiment.
Figure 4B:
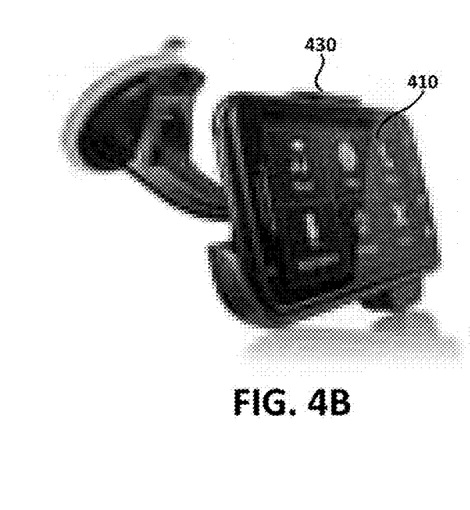
FIG. 4B illustrates an example in-vehicle cradle with connected electronic device, according to one embodiment.

FIG. 3 illustrates the physical coupling and/or connection of the device interface mechanism 230 of cradle 200 with accessory communication port 165 of mobile phone 100. FIG. 4A illustrates a real life representation of a mobile phone 410, such as a Motorola smart phone (of Motorola Mobility Inc.) docked within an example Motorola desktop cradle 420. Similarly, FIG. 4B illustrates an example in-vehicle/car cradle 430 within which the example phone 410 is connected. The embodiments described herein assume that the desktop cradle 420 is of a particular first type of cradle, identified by a first class (of cradles) having specific operational capabilities that are supported by that class (type) of cradles. Also assumed is that the in-vehicle/car cradle 430 is one of a second type cradle, identified by a second, different class of cradles, with a second set of operational capabilities that are supported by that second class (type) of cradles.

Those of ordinary skill in the art will appreciate that the hardware depicted in FIGS. 1 and 2 may vary depending on implementation. Other internal hardware or peripheral devices may be used in addition to or in place of the hardware depicted in FIGS. 1 and 2. Also, the processes of the present invention may be applied to any portable/handheld electronic device or data processing system or similar device with a connecting port for connecting the device to an accessory that is one of many different types (or classes) of accessories, with specific capabilities that can be supported by the device. Thus, the depicted examples are not meant to imply architectural limitations with respect to the presented embodiments.

In one or more embodiments, the IC 210 and specifically AC logic 220 associated with the IC 210 enables authentication of the cradle 200 with the connected electronic device (mobile phone 100) via a communication protocol, such as the whisper protocol. As utilized herein, the whisper protocol is a device authentication and configuration protocol that ensures that the cradle 200 is capable of being utilized with the electronic device (100) prior to transmitting the N device status bits 225 from the register to the electronic device (100) via the device interfacing mechanism 230. Accordingly, in the described embodiments, each cradle that supports the whisper protocol can, following detection of a connection of the electronic device, autonomously forward authentication and configuration data and supply 23 bits to the phone to identify (a) what broad category or class a cradle falls into and (b) which specific (optional) operational capabilities that cradle supports. When the mobile phone 100 is initially coupled to the cradle 200, the accessory authentication mechanism 160 of mobile phone 100 identifies the type (class) of the connected accessory by reading the value of the N device status bits 225 from the IC 210. It is appreciated that the actual location of the N device status bits within the cradle may vary, depending on the specific design of the cradle and programming of the corresponding AC logic, which retrieves the N device status bit for forwarding over the device interfacing mechanism.

Figure 5:
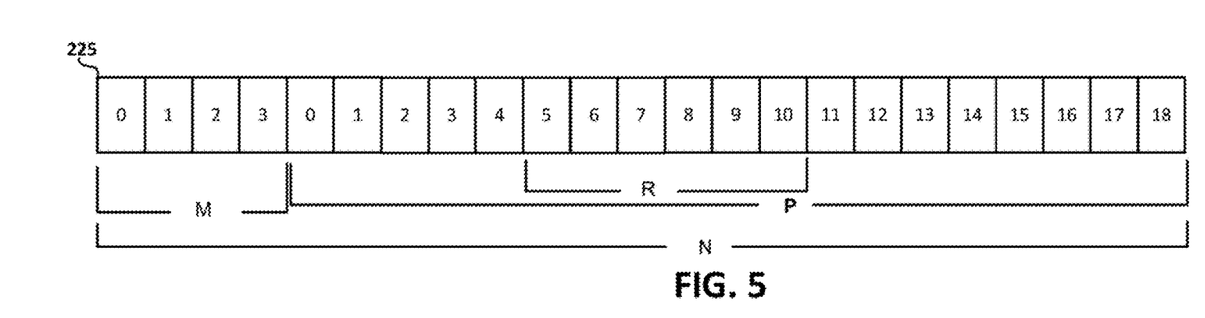
FIG. 5 is an example 23 bit register showing the N device status bits, separated into M class bits and P capabilities bits, according to one embodiment.

Referring now to FIG. 5, there is illustrated an example sequence of N device status bits 225 that can be stored within cradle 200 and which are provided to a connected electronic device (100) to complete authentication and configuration of the cradle 200 to support the connected electronic device (100). As provided by the illustrative embodiment, the number (N) of device status bits 225 can be 23 bits, although a different number of bits can be utilized in alternate embodiments. Also, even with the 23 bit configuration, some embodiments may utilize only a subset of the 23 bits to provide the M class bits and P capabilities bits. As further shown, the N device status bits 225 comprise two segments or sets of bits: a first segment of M class bits; and a second segment of P capabilities bits. In the specific example illustrated, with N equal to 23, there are four (4) bits reserved to indicate class type. Utilizing these four (4) bits allows for 15 unique classes of device, with one class defined for expansion. The remaining 19 bits of the 23 N device status bits 225 are used to indicate what optional feature(s) and/or capabilities are available within an identified class.

As defined herein, classes represent groups of cradles (or docks, as some cradles are called) which share common attributes as much as possible and are expected to utilize the same user interface (UI) component(s) during device operation. Towards this end, classes of cradles can be chosen that perform the same use-cases since these cradles will share the most attributes. For example, in one embodiment, all cradles/docks designed for utilization within a car can be part of the same class. According to the described embodiment, with M class bits defined, a total number of uniquely definable class types utilizing the M bits equals $2^M-1$ class types, with type values ranging from zero (0) through $2^M-2$. Where M=4, the range of classes runs from class 0 through class 14, with class 15 being reserved to indicate an extended class that is not uniquely identifiable with the M class bits.

Figure 6:
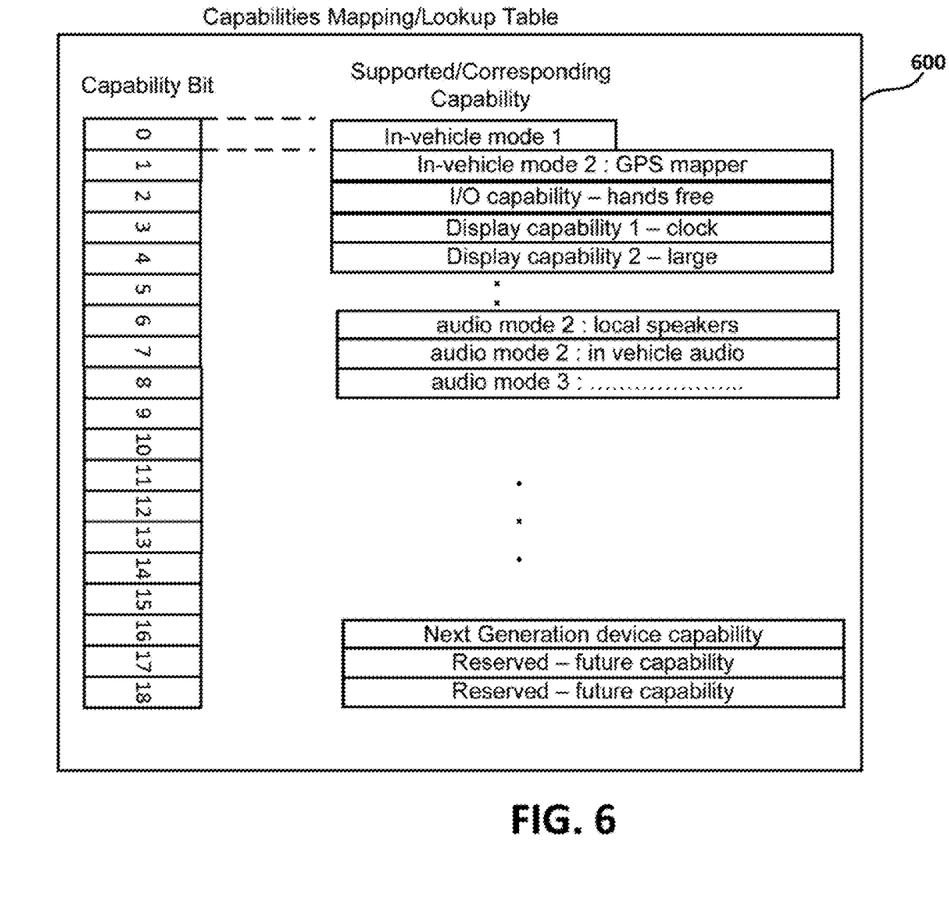
FIG. 6 illustrates an example capabilities mapping/look-up table, according to one embodiment.

Within each class type, identified by the M class bits, there are additionally a set of P capabilities bits that indicate and/or identify the specific capabilities of cradles/docks within the particular class. The definition of the capabilities field will depend on the class type that the capabilities field describes. Thus, in the described embodiments, features/capabilities that are common to a particular class are assumed to be present for most devices/cradles/docks of this class. The specific capabilities assigned to each bit of (or grouping of bits of) the set of P capabilities bits is shown by the capabilities mapping/look-up table 600 of FIG. 6. In one embodiment, a different capabilities mapping/lookup table 600 is provided for each class of cradle, and the respective bits within a first capabilities mapping/look-up table can be assigned to different capabilities from the same numbered bits of a second table. Within the table 600 is a listing of the P bits (specifically 19 bits in the illustrative embodiment) that can be each assigned to identify a specific capability of the supported/corresponding capabilities indicated to the right of each bit. Looking again at FIG. 5, in one implementation, the cradle can be one of a group of cradles that provides audio capabilities to the electronic device. With this embodiment, a pre-specified set of R bits from among the P capabilities bits are pre-assigned to define audio parameters of the cradle, where R is an integer between 1 and P.

As indicated by FIG. 5, a group of six (6) bits, indicated as R bits, can be dedicated to defining the audio parameters of the cradle/dock. Also, in one embodiment, where not all N device status bits 225 are utilized or defined, any undefined bits in the P capabilities bits should be programmed or set to a value of zero (0). With this setting of undefined bits to zero, old accessory devices can then be used with newer model mobile phones because the software of the newer model phone will check and confirm that none of the newer features within the class exist on this older cradle.

According to one embodiment, the M class bits are pre-set and are a same value for all cradles within a single group of cradles that have similar use (thus a same class type). The class type comprises a group of cradles that have similar use, share similar attributes and which utilize similar user interface components during operation of an electronic device (e.g., mobile phone) connected to one of the cradles within that group. The P capabilities bits are pre-set to identify features that are common within a particular class type to which the cradle belongs. The capabilities bits in a first class are unique to the first class and can be different from capabilities bits in a second class among the different class types. Also, in the described embodiments, N, M, P and R are integers, and P equals N−M when all N device status bits are assigned.

In one or more embodiments, when the pre-set class type of the cradle is identified via a type value that is larger than $2^M-2$, the M class bits are all pre-set to a logic 1 value, and the AC logic 220 (FIG. 2) of the IC transmits a class type value of $2^M-1$ to the connected electronic device (100). Transmission of a class type value of $2^M-1$ to the electronic device signals to the electronic device that a specific class type of the cradle is an extended class type that is determinable by the electronic device accessing a pre-established location that is accessible to the electronic device. The pre-established location is assumed to be separate from the cradle.

Figure 7:
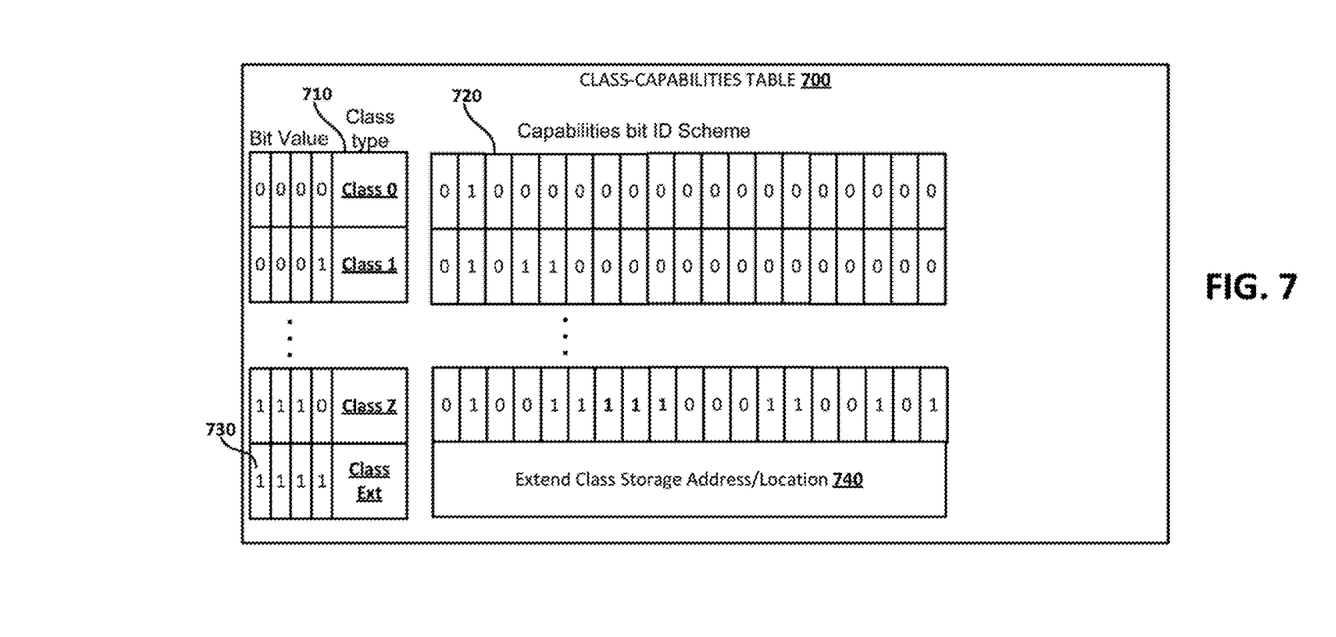
FIG. 7 is an example class capabilities table with a plurality of class types and corresponding capabilities bit ID scheme, according to one embodiment.

Referring now to FIG. 7 and with reference again to FIG. 1, stored within memory are a plurality of class capabilities tables 190a-n. In one embodiment, as illustrated by FIG. 1, each class comprises a separate table having a unique table ID (for that class) and including therein a corresponding capabilities mapping/lookup table (192) for that class. In another embodiment, illustrated by FIG. 7, a single class capabilities table 700 comprises a sequential listing of the $2^M-2$ classes 710, where M is an integer that equals four (4). Associated with each individually identified class 710 is a corresponding capabilities bit ID scheme 720, which indicates which capability bits have been established for that particular class (i.e., which capabilities are supported by cradles within that group of cradles belonging to that class). FIG. 7 also shows that within the class capabilities table 700, the final entry 730 representing binary value of $2^M-1$ (i.e., 1111, for M=4) corresponds to and/or provides a pointer to extend class storage address/location 740.

According to one embodiment, in response to the M class bits having a value equal to $2^M-1$, the AAC logic 180 of mobile phone 100 (FIG. 1) identifies that the M class bit value is equal to the final entry 730 of classes 710, which indicates that the class type is one of an extended class that is not represented within class capabilities table 700. The AAC logic 180 then retrieves the unique cradle identifier (CID) 218 (FIG. 2) from the authentication information received from the cradle 200 (FIG. 2). With the unique CID, AAC logic 180 accesses a pre-established location identified by the extend class storage address/location 740 (FIG. 7) within class capabilities table 700. In a first embodiment, AAC logic 180 matches the unique CID to CIDs within an extended class capabilities table 191 in which is listed one or more extended classes of devices. AAC logic 180 retrieves identifying information about the class type of the cradle and the associated capabilities supported by that class type, and AAC logic 180 provides that information to processor 106. Processor 106 can then trigger the configuration of the mobile phone 100 and/or cradle 200 to which the phone 100 is connected.

In the first embodiment, the pre-established location is a specific location within a storage facility (other storage 115) of mobile phone 100, having extended class capabilities table 191 in which is stored the identifying information of one or more additional class types that are different from the $2^M-1$ class types that are uniquely identifiable via the M class bits received from the cradle 200. AAC logic 180 thus accesses the pre-established local storage location (115, 191) and determines the class type by utilizing one or more unique (CIDs) retrieved from the cradle. AAC logic 180 also determines the capabilities supported by the cradle 200 by comparing the P capabilities bits with the capabilities bit ID scheme (similar to scheme 740) of the identified class type.

Figure 8:
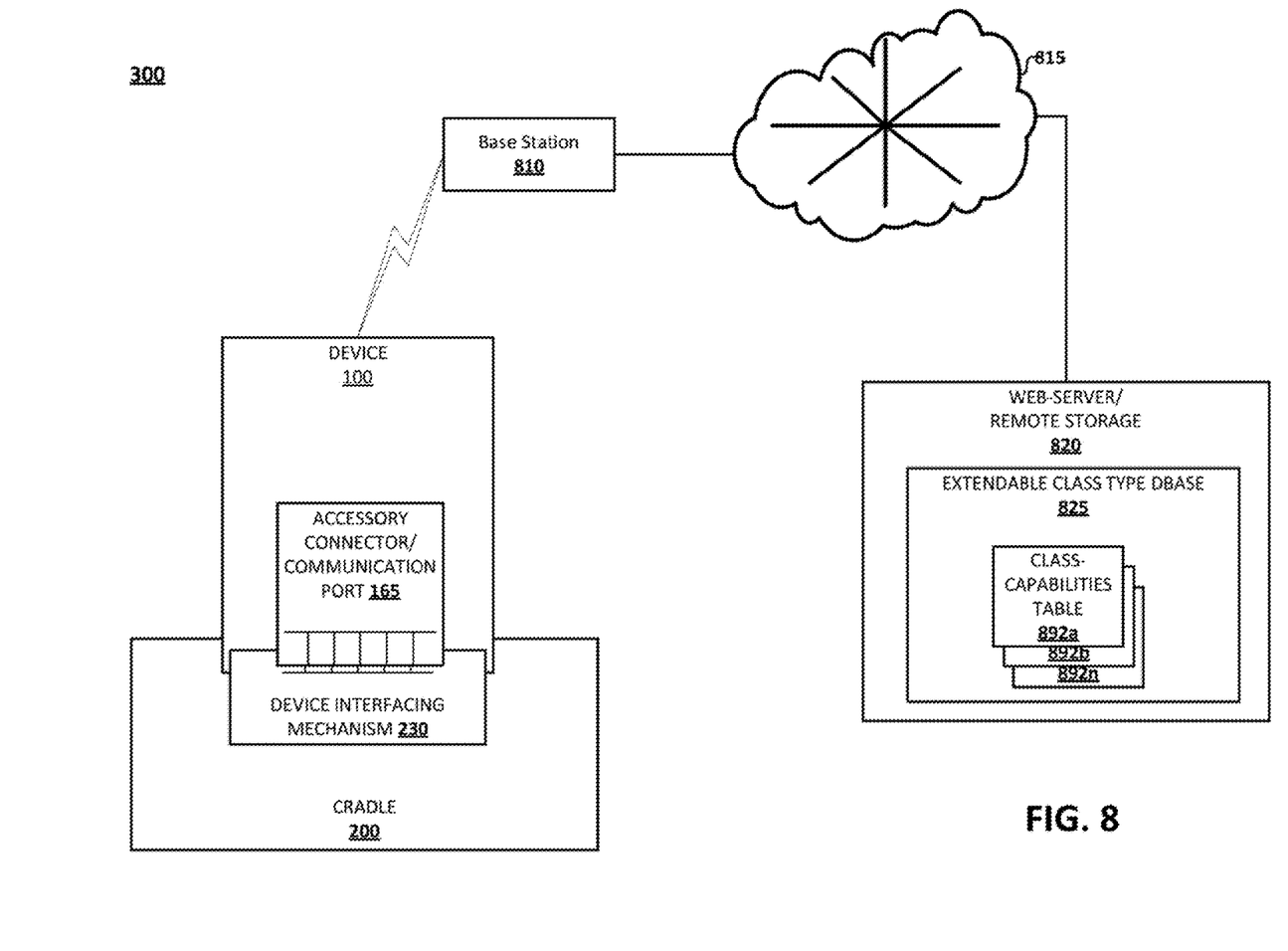
FIG. 8 is a system diagram depicting the connection of the electronic device via a network to a remote storage location to retrieve extended class and capabilities data for configuring a connected cradle, according to one embodiment.

In a second embodiment, and as illustrated by FIG. 8, the pre-established location is a specific remote storage location 820 accessible via a wireless network to which mobile phone 100 connects. As shown, mobile phone connects via wireless communication with base station 810, which generally represents any of the various types of base stations supporting any one of the various wireless communication protocols (e.g., WiMAX, LTE, CDMA, and/or others). Base station 810 in turn connects to a network 815 which can be or can comprise one or a combination of a wireless network and a wired/physical network. A web server provides remote storage 820, which is accessible through network 815 and at which is stored identifying information of different classes of cradles within an extendable class type database 825. As shown, extendable class type database 825 comprises one or a plurality of class capability tables 892*a-n* within which additional class types are identified that are different from the $2^M-1$ class types corresponding to the M class bits received from the cradle. Also provided with these additional class types are corresponding capability bit schemes for each extended class.

AAC logic 180 accesses the pre-established remote storage location, and using the unique CID, AAC logic 180 determines the class type of the cradle. AAC logic further downloads the class type and the corresponding capabilities bit ID scheme of that class type to local storage (115) or memory 110 and determines the capabilities supported by the cradle 200 by comparing the P capabilities bits with the capability bit scheme of the downloaded class type.

Figure 9:
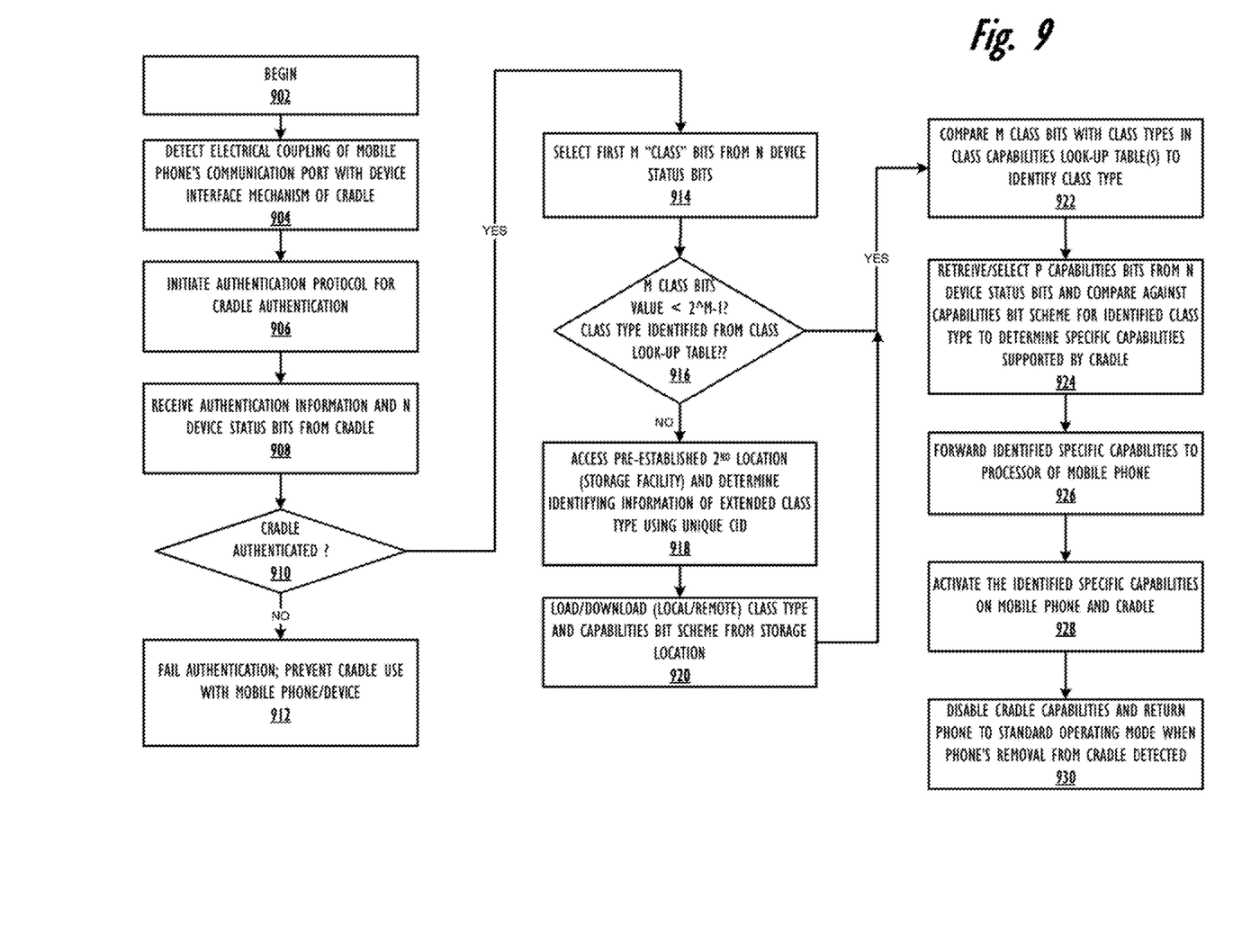
FIG. 9 is a high level logical flowchart of an exemplary method by which accessory authentication and configuration logic configures the electronic device when connected to a cradle to use specific capabilities associated with the particular class of cradle, according to one embodiment.

The flow chart of FIG. 9 illustrates a method by which the above processes of the illustrative embodiments can be completed. More specifically, FIG. 9 illustrates the method by which the AAC logic in conjunction with processor 106 of mobile phone 100 configures the mobile phone and the cradle to activate all of the capabilities made available by the particular class of cradle during the cradle authentication processes. Although the method illustrated in FIG. 9 may be described with reference to components and functionality illustrated by and described in reference to FIGS. 1-8, it should be understood that this is merely for convenience and alternative components and/or configurations thereof can be employed when implementing the method. Certain portions of the method can be completed by AACU 194 executing on processor 106 within mobile phone 100 (FIG. 1) or alternatively by AAC logic 180 in conjunction with accessory authentication mechanism 160. The executed processes then control specific operations of or on mobile phone 100 and/or cradle 200. For simplicity is describing the methods, all method processes are described from the perspective of AAC logic 180 and/or accessory authentication mechanism 160 within mobile phone 100.

The method begins at initiator block 902 and proceeds to block 904 at which accessory authentication mechanism 160 detects electrical coupling of accessory communication port 165 of mobile phone 100 with device interface mechanism 230 of cradle 200. Accessory authentication mechanism 160 initiates a cradle authentication protocol (block 906), and receives authentication information along with N device status bits from IC 210 of cradle 200 (block 908). Accessory authentication mechanism 160 performs the pre-programmed authentication steps and determines at block 910 whether the cradle was authenticated. The method for performing authentication of, and particularly for performing secure authentication of, a cradle (or other accessory) coupled to mobile phone and for communicating with the mobile phone via the particular communication protocol, is beyond the scope of this disclosure, and thus no specific detail of that process is presented herein. Returning to decision block 910, in response to the cradle not authenticating, the accessory authentication mechanism fails the authentication process and prevents further communication and/or use of the cradle with the mobile phone (block 912).

In one embodiment, the mobile phone 100 uses the device status bits as a part of the authentication test. With this implementation, the authentication test includes one or more of: (a) a first verification check of the accessory/cradle as an official product category; (b) a second verification check to identify a corresponding serial number of the cradle; and (c) a third verification check to identify features of the accessory. During the authentication process, the accessory authentication mechanism 160 utilizes ID information of the cradle (CID) to determine whether the cradle is one of: (a) a first cradle having a newer design; and (b) a second cradle having an earlier design, typically with fewer capabilities. The wireless device can then utilize the third verification check to determine whether one or more of a newer set of features is supported by the older cradle. If the cradle is a second cradle having the earlier design and one or more of the newer set of features is provided by the second cradle, the AAC logic 180 can establish a fail status for the third verification check, and the AAC logic 180 then causes the cradle authentication to fail.

However, once the cradle is successfully authenticated, AAC logic 180, in response to receiving the N device status bits, selects a first set of M bits from the N device status bits as the M class bits (block 914). In one embodiment, AAC logic 180 receives the N device status bits by reading a stored value of the register holding the N device status bits stored within a crypto-authentication integrated circuit (IC) of the cradle. This reading of the register occurs during or following completion of the authentication protocol. Following the reading of the M class bits, AAC logic 180 checks (block 916) whether the class bit value is within the range of $2^M-1$ classes (i.e., Class 0 through Class $2^M-1$) that are individually supported by the M class bits and are identifiable from the class capabilities tables 190*a-n*. Specifically, AAC logic 180 determines whether the class bits value is less than $2^M-1$.

When the class bits value is not less than $2^M-1$ (i.e., all M bits equal 1), AAC logic 180 reads the storage location (740, FIG. 7) of the extended class entry in the class capabilities table (700), and AAC logic 180 triggers processor 106 to access the pre-established second storage location (other storage 115 or remote storage 820) and utilize the unique CID of the cradle to determine the class type of the cradle (i.e., the ID of the extended class) (block 918). AAC logic 180 and/or processor 106 loads or downloads the class type information along with the corresponding capabilities bit scheme from the second storage location (block 920). Returning to decision block 916, when the class bits value is less than $2^M-1$, AAC logic 180 compares the M class bits against class types provided within the one or more class capabilities look-up tables 190a-n. AAC logic 180 searches for a match of the M class bits to identify the class of the cradle (block 922). In response to matching the M class bits to a specific class type within the one or more class capabilities look-up tables, AAC logic 180 determines which of the one or more capabilities are supported by the cradle by: retrieving the P capabilities bits from the N device status bits; accessing a class capabilities mapping table for the matching class type; aligning each of the P capabilities bits with a sequence of bits comprising the capability bit ID scheme that are pre-defined to represent specific capabilities for the matching class type; and identifying the specific capabilities associated with (or supported by) the cradle from the various pre-defined capabilities (block 924).

Thus, once the class type is determined, AAC logic 180 identifies one or more capabilities associated with the matching class type; and determines which of the one or more capabilities are supported by the cradle based on a comparison of the P capabilities bits retrieved from the N device status bits against a capability bit identification (ID) scheme for that matching class type. AAC logic 180 then forwards information identifying the specific capabilities of the cradle to the processor 106 of the mobile phone 100 (block 926). Processor 106 responds to receipt of the identified specific capabilities by activating each capability that is supported by the mobile phone and/or cradle (block 928). Accessory authentication mechanism 160 and/or AAC logic 180 disables cradle capabilities and returns mobile phone 100 to standard operating mode when a disconnection/separation of the accessory communication port 165 of mobile phone 100 from device interface mechanism 230 of cradle 200 is detected (block 930).

In one implementation, the mobile phone 100 comprises program code stored on memory 110 and executed by processor 106 that triggers specific I/O operations of the mobile phone 100 to enable utilization of available capabilities of the cradle 200 while the mobile phone is connected to cradle 200. The specific I/O operations can be triggered based on receipt by the processor 106 of information identifying (a) the matching class type of the cradle 200, determined from the M class bits, and (b) the capabilities of that class type which are supported by the cradle 200, as determined by a comparison of bit values of the P capabilities bits retrieved from the N device status bits against a capabilities mapping table (600, FIG. 6) for that class type. In one specific implementation, the I/O components of mobile phone 100 comprise audio components, such as speakers. Then, in response to the AAC logic 180 determining that the cradle is within a class of cradles that supports audio capabilities of the mobile phone, where a specific set of R bits from among the P capabilities bits are assigned to define audio parameters of the cradle, the AAC logic 180 retrieves the value of the R bits and triggers the processor 106 to implement a specific audio capability, corresponding to the value of the R bits, of/on the mobile phone 100 and/or the cradle 200.

The flowchart and block diagrams in the various figures presented and described herein illustrate the architecture, functionality, and operation of possible implementations of systems, devices, and methods according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be further appreciated, the processes in the described embodiments can be implemented using any combination of software, firmware or hardware. While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the embodiments without departing from the essential scope thereof. Therefore, it is intended that the invention not be limited to the particular embodiments disclosed, but will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments has been presented for purposes of illustration and description, but is not intended to be exhaustive or limited to the form disclosed. Many modifications and variations will be apparent to those of ordinary skill in the art without departing from the scope and spirit of the overall disclosure. The embodiments were chosen and described in order to best explain the principles of the disclosure and the practical application, and to enable others of ordinary skill in the art to understand the invention for various embodiments with various modifications as are suited to the particular use contemplated.

What is claimed is:

1. A cradle for receiving an electronic device, the cradle comprising:
   an external casing having a device interfacing mechanism;
   an integrated circuit (IC) disposed within the casing and electrically coupled to the device interfacing mechanism, wherein the IC comprises authentication information of the cradle and N device status bits having: (a) a first set of M class bits that define to the electronic device a particular class type of the cradle among a plurality of different classes of cradles; and (b) a second set of P capabilities bits that identify to the electronic device which functionality of a plurality of possible functionalities are supported by the cradle for the identified class type of the cradle; and
   a logic module associated with the IC that, responsive to detection of an electrical coupling of a communication port of the electronic device to the device interfacing mechanism of the cradle, automatically transmits the N device status bits to the electronic device;
   wherein transmission of the N device status bits causes the electronic device to activate specific operating functions based on receipt and identification of the M class bits and P capabilities bits transmitted from the cradle.

2. The cradle of claim 1, wherein the IC and the logic module associated with the IC further enables authentication of the cradle with the electronic device via a whisper protocol to ensure that the cradle is capable of being utilized with the electronic device prior to transmitting the N device status bits to the electronic device.

3. The cradle of claim 1, wherein:
   the M class bits are pre-set and are a same value for all cradles within a class type comprising a group of cradles that have similar use, share similar attributes and which utilize similar user interface components during operation of the electronic device connected to the cradle; and
   the P capabilities bits are pre-set to identify features that are common within a particular class type to which the cradle belongs, wherein capabilities bits in a first class are unique to the first class and can be different from capabilities bits in a second class among the different class types.

4. The cradle of claim 3, wherein N, M and P are integers and P equals N−M.

5. The cradle of claim 4, wherein the cradle is one of a group of cradles that provides audio capabilities to the electronic device, and a specified set of R bits from among the P capabilities bits are pre-assigned to define audio parameters of the cradle, wherein R is an integer between 1 and P.

6. The cradle of claim 1, wherein N equals 23 and M equals 4.

7. The cradle of claim 1, wherein a total number of uniquely definable class types utilizing the M bits equals $2^M-1$ class types, with type values ranging from zero though $2^M-2$.

8. The cradle of claim 7, wherein when the class type of the cradle is identified via a type value that is larger than $2^M-2$, the M class bits are all pre-set to a logic 1 value and the logic module of the IC transmits a class type value of $2^M-1$ to the electronic device, wherein transmission of a class type value of $2^M-1$ to the electronic device signals to the electronic device that a specific class type of the cradle is an extended class type that is determinable by the electronic device accessing a pre-established location that is accessible to the electronic device and separate from the cradle.

9. The cradle of claim 1, wherein the electronic device is a mobile phone and the communication port of the mobile phone enables the mobile phone to be docked to the cradle, and, following authentication of the cradle, the mobile phone is subsequently placed in a specific operational mode corresponding to the class type identified by the M class bits transmitted to the mobile phone from the cradle.

10. The mobile phone of claim 1, further comprising:
    one or more input/output (I/O) components, coupled to the processor;
    program code stored on the memory and executed by the processor that triggers specific I/O operations of the mobile phone to enable utilization of available capabilities of the cradle while the mobile phone is connected to the cradle, wherein the specific I/O operations are triggered based on receipt by the processor of information identifying the matching class type of the cradle, determined from the M class bits, and the capabilities of that class type which are supported by the cradle, determined by a comparison of bit values of the P capabilities bits retrieved from the N device status bits against a capabilities mapping table for that class type.

11. The mobile phone of claim 10, wherein the I/O components comprise audio components and in response to the configuration logic determining that the cradle is within a class of cradles that supports audio capabilities of the mobile phone, in which a specific set of R bits from among the P bits are assigned to define audio parameters of the cradle, where R is an integer value less than P, the configuration logic retrieves the value of the R bits and triggers the processor to implement a specific audio capability of the mobile phone and the cradle corresponding to the value of the R bits.

12. A mobile phone comprising:
    a processor;
    a memory component couple to the processor and having stored thereon one or more class capabilities look-up tables;
    a communication port coupled to the processor that enables connection of the mobile phone to a device interface mechanism of an accessory;
    an accessory authentication mechanism including configuration logic that, responsive to detection of an electrical coupling of the communication port with a device interface mechanism of a cradle:
      initiates an authentication protocol to authenticate the cradle as being an approved device for communicatively connecting with the mobile phone;
      receives, from the cradle, N device status bits having a first set of M class bits that identify a class type of the cradle and a second set of P capabilities bits that identify one or more capabilities of that class type that are supported by the cradle; and
      activates, on the mobile phone and cradle, the one or more specific capabilities supported by the cradle, based on the class type and associated one or more capabilities of that class type identified by the N device status bits.

13. The mobile phone of claim 12, wherein the configuration logic receives the N device status bits by reading a current value of the N device status bits stored within an integrated circuit (IC) of the cradle during completion of the authentication protocol.

14. The mobile phone of claim 13, wherein, in response to receiving the N device status bits, the configuration logic:
    selects a first set of M bits as the M class bits from the N device status bits;
    compares the M class bits against class types provided within the one or more class capabilities look-up tables for a match; and in response to matching the M class bits to a specific class type within the one or more class capabilities look-up tables: identifies one or more capabilities associated with the matching class type; and determines which of the one or more capabilities are supported by the cradle based on a comparison of the P capabilities bits retrieved from the N device status bits against a capability bit identification (ID) scheme for that matching class type.

15. The mobile phone of claim 14, wherein:

the class type is one of multiple available class types each identifying a different group of cradles that share similarities in use and share similar attributes and which utilize similar user interface components during operation of the mobile phone while the mobile phone is connected to one of the cradles within that class;

the M class bits are pre-set and are a same value for all cradles within a single group of cradles that have similar use; and the P capabilities bits are pre-set to identify features that are available within the cradle for a particular class type to which the cradle belongs, wherein capabilities bits in a first class are unique to the first class and can be different from capabilities bits in a second class among the different class types.

16. The mobile phone of claim 14, wherein the configuration logic determines which of the one or more capabilities are supported by the cradle by: retrieving the P capabilities bits from the N device status bits; accessing a class capabilities mapping table for the matching class type; aligning each of the P capabilities bits with a sequence of bits comprising the capability bit ID scheme that are pre-defined to represent specific capabilities for the matching class type; identifying the specific capabilities associated with the cradle from the pre-defined capabilities; and forwarding information identifying the specific capabilities of the cradle to the processor, wherein the processor responds to receipt of the identified specific capabilities by activating each capability that is supported by the mobile phone.

17. The mobile phone of claim 14, wherein in response to the M class bits having a value equal to $2^M-1$, the configuration logic: identifies that the M class bit value indicates that the class type is one of an extended class; retrieves a unique cradle identifier (CID) from the authentication information received from the cradle; and accesses a pre-established location with the unique CID to retrieve identifying information about the class type of the cradle and the associated capabilities supported by that class type.

18. The mobile phone of claim 17, wherein:

the pre-established location is a specific location within a storage facility of the mobile phone in which is stored the identifying information of one or more additional class types that are different from the $2^M-1$ class types which are uniquely identifiable via the M class bits received from the cradle; and the configuration logic accesses the pre-established location, determines the class type by utilizing one or more unique cradle identifiers (CIDs) retrieved from the cradle, and determines the capabilities supported by the cradle by comparing the P capabilities bits with the capabilities bit ID scheme of the class type.

19. The mobile phone of claim 17, wherein:

the pre-established location is a specific remote storage location accessible over a wireless network to which the mobile phone connects and at which is stored identifying information of different classes of cradles having one or more additional class types and corresponding capability bit schemes that are different from the $2^M-1$ class types corresponding to the M class bits received from the cradle; and the configuration logic accesses the pre-established location with a unique cradle identifier (CID), determines the class type of the cradle using the unique CID, downloads the class type and the corresponding capabilities bit ID scheme of that class type to local storage, and determines the capabilities supported by the cradle by comparing the P capabilities bits with the capability bit scheme of the downloaded class type.

20. The mobile phone of claim 12, wherein P, N, and M are integer values, P equals N−M, N equals 23, and M equals 4.

* * * * *